US010001853B2

United States Patent
Huang et al.

(10) Patent No.: US 10,001,853 B2
(45) Date of Patent: Jun. 19, 2018

(54) TOUCH GRATING CELL AND TOUCH STEREOSCOPIC DISPLAY DEVICE

(71) Applicants: BOE TECHNOLOGY GROUP CO., LTD., Beijing (CN); CHENGDU BOE OPTOELECTRONICS TECHNOLOGY CO., LTD., Chengdu, Sichuan (CN)

(72) Inventors: Xiaomei Huang, Beijing (CN); Benyin Ye, Beijing (CN); Youqiang Lu, Beijing (CN)

(73) Assignees: BOE TECHNOLOGY GROUP CO., LTD., Beijing (CN); CHENGDU BOE OPTOELECTRONICS TECHNOLOGY CO., LTD., Chengdu, Sichuan (CN)

( * ) Notice: Subject to any disclaimer, the term of this patent is extended or adjusted under 35 U.S.C. 154(b) by 0 days. days.

(21) Appl. No.: 14/785,988

(22) PCT Filed: Mar. 27, 2015

(86) PCT No.: PCT/CN2015/075271
§ 371 (c)(1),
(2) Date: Oct. 21, 2015

(87) PCT Pub. No.: WO2016/074415
PCT Pub. Date: May 19, 2016

(65) Prior Publication Data
US 2016/0349888 A1    Dec. 1, 2016

(30) Foreign Application Priority Data
Nov. 14, 2014  (CN) .......................... 2014 1 0647772

(51) Int. Cl.
*G06F 3/041*    (2006.01)
*G02B 27/22*    (2018.01)
(Continued)

(52) U.S. Cl.
CPC ....... *G06F 3/0412* (2013.01); *G02B 27/2214* (2013.01); *G02F 1/13338* (2013.01);
(Continued)

(58) Field of Classification Search
CPC ........ G06F 3/0412; G06F 2203/04103; H04N 13/0409; G02F 1/13338; G02F 1/134309;
(Continued)

(56) References Cited

U.S. PATENT DOCUMENTS

2013/0162918 A1  6/2013  Mayumi et al.
2013/0314624 A1  11/2013  Li et al.
(Continued)

FOREIGN PATENT DOCUMENTS

CN    102231032 A    11/2011
CN    102736293 A    10/2012
(Continued)

OTHER PUBLICATIONS

International Search Report & Written Opinion Appln. No. PCT/CN2015/075271; dated Aug. 24, 2015.
(Continued)

*Primary Examiner* — Matthew Sim
(74) *Attorney, Agent, or Firm* — Ladas & Parry LLP; Loren K. Thompson

(57) ABSTRACT

A touch grating cell and a touch stereoscopic display device are provided. The touch grating cell comprises: a first substrate (10) and a second substrate (20) arranged opposite to each other; a liquid crystal layer (30) arranged between the first substrate (10) and the second substrate (20); a first transparent electrode structure (40), arranged on the first substrate (10); and a second transparent electrode structure (50), arranged on the second substrate (20), wherein each of the first transparent electrode structure (40) and the second transparent electrode structure (50) includes a plurality of
(Continued)

multiplex electrodes (41, 51); in a touch period, the multiplex electrode (41) in the first transparent electrode structure (40) and the multiplex electrode (51) in the second transparent electrode structure (50) are used as a touch driving electrode and a touch sensing electrode, respectively, and are perpendicular to each other in extending directions; and in a display period, the multiplex electrode (41) in the first transparent electrode structure (40) and the multiplex electrode (51) in the second transparent electrode structure (50) are used as a common electrode and a grating electrode, respectively. Because a touch function is integrated in the grating cell, the grating electrode and the common electrode are shared with the touch driving electrode and the touch sensing electrode, respectively, so that a production process is reduced, cost is saved, and a purpose of thinning is achieved.

17 Claims, 3 Drawing Sheets

(51) Int. Cl.
  *G02F 1/1333*  (2006.01)
  *G02F 1/1343*  (2006.01)
  *H04N 13/04*   (2006.01)

(52) U.S. Cl.
  CPC .... *G02F 1/13439* (2013.01); *G02F 1/134309* (2013.01); *G06F 3/041* (2013.01); *G02F 2001/134318* (2013.01); *G02F 2201/121* (2013.01); *G02F 2201/122* (2013.01); *G06F 2203/04103* (2013.01); *H04N 13/0409* (2013.01)

(58) Field of Classification Search
  CPC ........... G02F 1/13439; G02F 2201/121; G02B 27/2214
  See application file for complete search history.

(56) References Cited

U.S. PATENT DOCUMENTS

| | | | |
|---|---|---|---|
| 2014/0253490 A1* | 9/2014 | Sumi .................. | G09G 3/003 345/174 |
| 2015/0035766 A1* | 2/2015 | Chung ................ | G06F 3/0412 345/173 |
| 2015/0168761 A1* | 6/2015 | Chang ................ | G02F 1/13338 349/12 |

FOREIGN PATENT DOCUMENTS

| | | |
|---|---|---|
| CN | 103116233 A | 5/2013 |
| CN | 203037967 A | 7/2013 |
| CN | 103885228 A | 6/2014 |
| CN | 104035227 A | 9/2014 |
| CN | 104123038 A | 10/2014 |
| CN | 104317134 A | 1/2015 |
| CN | 204101862 U | 1/2015 |
| TW | 201348798 A | 12/2013 |
| WO | 2012036015 A1 | 3/2012 |

OTHER PUBLICATIONS

First Chinese Office Action Appln. No. 201410647772.4; dated Nov. 13, 2015.

* cited by examiner

TOUCH GRATING CELL AND TOUCH STEREOSCOPIC DISPLAY DEVICE

TECHNICAL FIELD

Embodiments of the present disclosure relate to a touch grating cell and a touch stereoscopic display device.

BACKGROUND

At present, one kind of naked-eye three-dimensional stereoscopic display devices may include a display screen and a liquid crystal grating cell which can switch between 2D and 3D modes. For example, the liquid crystal grating cell may be arranged between the display screen and a backlight source, and a stereoscopic display function is realized by a parallax barrier method. FIG. 1 shows a structural schematic diagram of a stereoscopic display device implemented by using a liquid crystal grating cell, as shown in FIG. 1, a backlight source 02 is arranged below a liquid crystal grating cell 01, and a display screen 04 is attached above the liquid crystal grating cell 01 through an adhesive 03. However, for the stereoscopic display device shown in FIG. 1, it is required to additionally add a layer of a touch screen (not shown in FIG. 1) on an outer surface of the display screen 04, so as to realize a touch function.

Since conventionally a touch screen and a stereoscopic display device are two independent display devices, it is needed to attach the touch screen outside the stereoscopic display device (i.e., the display screen), to form a touch screen stereoscopic display device. Here, taking a stereoscopic display device including a liquid crystal grating cell as an example, for the liquid crystal grating cell, electrodes are arranged in such a way that the liquid crystal grating cell forms a grating in which a light-transmitting region and a light-shielding region are arranged alternately in a case that it is powered on or off, and thus a parallax barrier stereoscopic display is realized. The touch screen on an outer surface of the display screen 04 and the liquid crystal grating cell described above are two independent devices, which may be obtained by performing a corresponding fabrication process (e.g., a MASK process) on a base substrate, respectively, and therefore, the fabrication process is complex, fabrication cost is high, and a layer of a touch screen is additionally added on an outer surface of the display screen to realize a touch function, which may increase an overall thickness of the display device.

SUMMARY

Embodiments of the disclosure provide a touch grating cell and a touch stereoscopic display device, which can simplify manufacturing processes of a touch screen and a stereoscopic display device, and reduce production cost.

In one aspect, an embodiment of the disclosure provides a touch grating cell, comprising: a first substrate and a second substrate, arranged opposite to each other; a liquid crystal layer, arranged between the first substrate and the second substrate; a first transparent electrode structure, arranged on the first substrate; and a second transparent electrode structure, arranged on the second substrate, wherein each of the first transparent electrode structure and the second transparent electrode structure includes a plurality of multiplex electrodes; in a touch period, the multiplex electrode in the first transparent electrode structure and the multiplex electrode in the second transparent electrode structure are used as a touch driving electrode and a touch sensing electrode, respectively, and are perpendicular to each other in extending directions; and in a display period, the multiplex electrode in the first transparent electrode structure and the multiplex electrode in the second transparent electrode structure are used as a common electrode and a grating electrode, respectively.

In another aspect, an embodiment of the disclosure further provides a touch stereoscopic display device, comprising a display screen and the touch grating cell described above; the touch grating cell is arranged on a light outgoing surface of the display screen, and a backlight is arranged on a light incoming surface of the display screen.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the invention apparent, the technical solutions of the embodiment will be described in a clearly and fully understandable way in connection with the drawings related to the embodiments of the invention. It is obvious that the described embodiments are just a part but not all of the embodiments of the invention. Based on the described embodiments herein, those skilled in the art can obtain other embodiment(s), without any inventive work, which should be within the scope of the invention.

Figure 1:
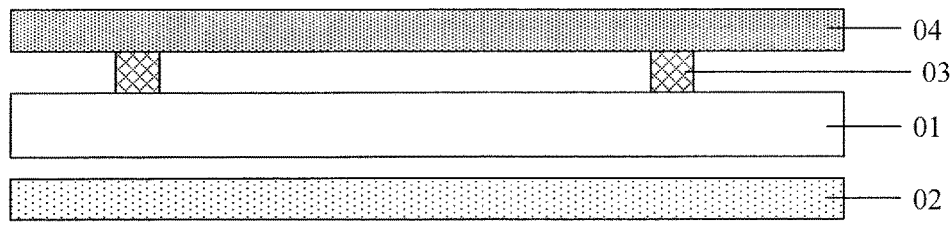
FIG. 1 is a structural schematic diagram of an existing stereoscopic display device.
Figure 2:
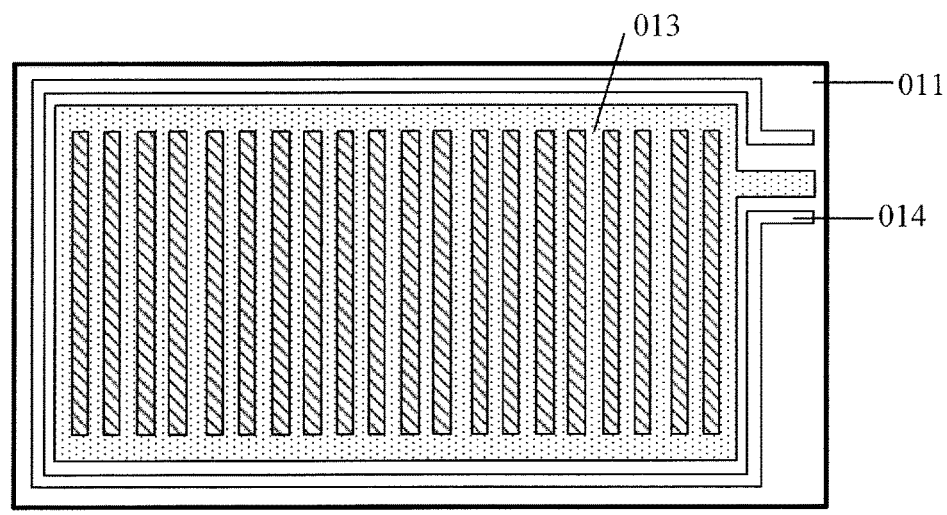
FIG. 2 is a plan schematic diagram of a grating electrode of a lower substrate of an exemplary liquid crystal grating cell.
Figure 3:
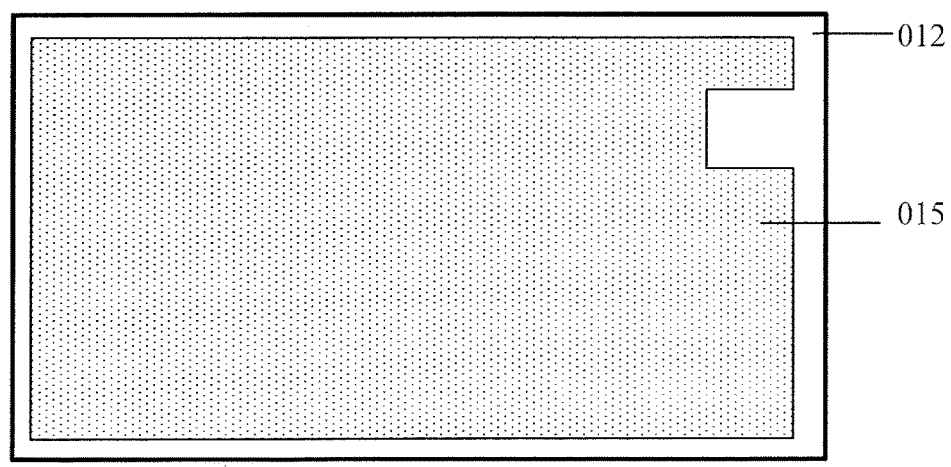
FIG. 3 is a plan schematic diagram of a common electrode of an upper substrate of the exemplary liquid crystal grating cell.

Structural diagrams of a liquid crystal grating cell are shown in FIG. 2 and FIG. 3, and the liquid crystal grating cell adopts a Twisted Nematic (TN) type liquid crystal, which comprises two substrates: an upper substrate 011 and a lower substrate 012, and there is filled with liquid crystal between the two substrates, and a strip electrode is fabricated on the lower substrate 011 as a grating electrode 013, which is usually made of a transparent conductive material such as Tin Oxide Indium (ITO), as shown in FIG. 2, a common electrode line 014 is arranged in a periphery of the grating electrode 013 in FIG. 2; and a plate electrode is fabricated on the upper substrate 012 as a common electrode 015, and the common electrode 015 is also made of ITO, as shown in FIG. 3. An electrode lead of the common electrode line 014 on the lower substrate 011 is electrically connected to the common electrode 015 on the upper substrate 012 through a conductive Au ball between the upper and lower substrates, so that a liquid crystal grating is formed by inputting a signal into the common electrode line 014 to drive the TN type liquid crystal between the upper and lower substrates to deflect.

Hereinafter, the embodiments of the disclosure will be further illustrated in detail in conjunction with the accompanying drawings. The following embodiments are not to limit the scope of the embodiments of the disclosure.

A First Embodiment

Figure 4:
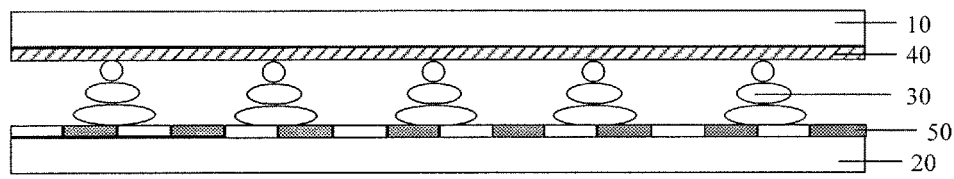
FIG. 4 is a cross-sectional structural diagram of a touch grating cell provided by a first embodiment of the disclosure.

The first embodiment provides a touch grating cell, with a cross-sectional view shown in FIG. 4, comprising: a first substrate 10 and a second substrate 20 arranged opposite to each other and a liquid crystal layer 30 arranged between the first substrate 10 and the second substrate 20; and further comprising: a first transparent electrode structure 40 arranged on the first substrate 10, and a second transparent electrode structure 50 arranged on the second substrate 20, wherein both the first transparent electrode structure 40 and the second transparent electrode structure 50 include a plurality of multiplex electrodes, and the first transparent electrode structure 40 and the second transparent electrode structure 50 are arranged on surfaces of the first substrate 10 and the second substrate 20 close to the liquid crystal layer 30, respectively.

In a touch period, the multiplex electrode in the first transparent electrode structure 40 and the multiplex electrode in the second transparent electrode structure 50 are used as a touch driving electrode and a touch sensing electrode, respectively, and are perpendicular to each other in extending directions;

In a display period, the multiplex electrode in the first transparent electrode structure 40 and the multiplex electrode in the second transparent electrode structure 50 are used as a common electrode and a grating electrode, respectively.

In the touch grating cell according to the embodiment of the disclosure, a touch screen is embedded in the grating cell, and corresponding patterns may be fabricated on a pair of base substrates, so the grating cell can realize different functions in the touch period and the display period, that is, a pattern having a touch function and a pattern having a stereoscopic display function are integrated into a same pattern, which can reduce a complex process of fabricating patterns separately, and further save one pair of base substrates, thereby saving material and fabrication cost. Meanwhile, an in-cell structure may have a touch function and a stereoscopic display functions on a premise of reducing an overall thickness.

Figure 5:
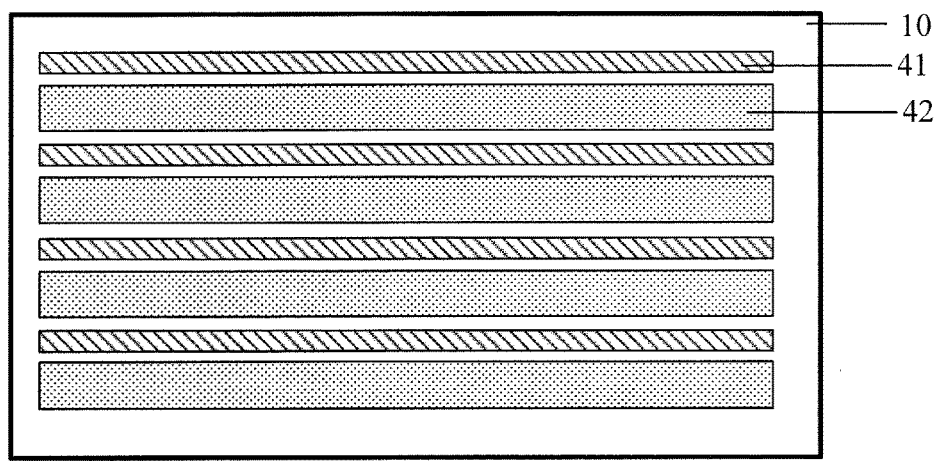
FIG. 5 is a plan schematic diagram of a first transparent electrode structure on a first substrate provided by the first embodiment of the disclosure.

Optionally, in the embodiment, the first transparent electrode structure 40 includes a multiplex electrode 41 and a first electrode 42; the first electrode 42 is used as a common electrode in the display period, and is used as a touch signal blank region in the touch period. Exemplarily, in the first transparent electrode structure 40, a width of the first electrode 42 is greater than a width of the multiplex electrode 41, and in the first transparent electrode structure 40, the first electrode 42 and the multiplex electrode 41 are arranged alternately at an interval. A plane schematic diagram of the first transparent electrode 40 structure on a first substrate 10 is shown in FIG. 5, and the multiplex electrode 41 is used as a common electrode in the display period, and is used as a touch driving electrode in the touch period; and there is the first electrode 42 having the width greater than that of the multiplex electrode 41 between the multiplex electrodes 41, and the first electrode 42 is also used as a common electrode in the display period, but is used as the touch signal blank region in the touch period, which can prevent interference to a touch signal of each other caused by too close distribution of the touch driving electrodes.

Exemplarily, the multiplex electrode 41 and the first electrode 42 on the first substrate 10 are arranged in parallel along a direction of a long side of the first substrate 10. The multiplex electrode 41 and the first electrode 42 are distributed in rows or columns, and it is arranged in rows in FIG. 5, of which a signal line of an odd-numbered row corresponds to the multiplex electrode, a signal line of an even-numbered row corresponds to the first electrode, and the width of the first electrode is greater than that of the multiplex electrode.

It should be noted that, a distance between adjacent multiplex electrodes 41 in the first transparent electrode structure 40 is associated with a pre-designed touch resolution; if it is desired to achieve a higher touch resolution, it is necessary to reduce the distance between the multiplex electrodes 41; conversely, if it is desired to achieve a lower touch resolution, it is necessary to increase the distance between the multiplex electrodes 41.

Optionally, in the second transparent electrode structure 50 in the embodiment, a plurality of strip electrodes are included, and each of the multiplex electrodes 51 in the second transparent electrode structure 50 includes at least two adjacent strip electrodes, which are electrically connected with each other by connecting both ends thereof to a signal line, respectively.

Figure 6:
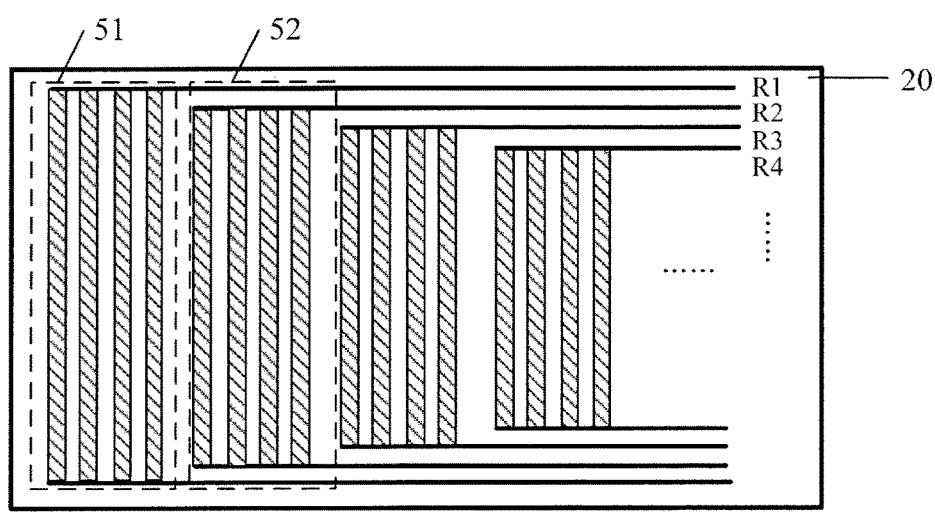
FIG. 6 is a plan schematic diagram of a second transparent electrode structure on a second substrate provided by the first embodiment of the disclosure.

Exemplarily, in the second transparent electrode structure 50, the multiplex electrodes 51 are spaced by a second electrode 52, and the second electrode 52 is used as the touch signal blank region in the touch period. The second electrode 52 may also include at least two adjacent strip electrodes, which are electrically connected with each other by connecting both ends thereof to a signal line, respectively. A plane schematic diagram of a second transparent electrode structure 50 on a second substrate 20 is shown in FIG. 6, the multiplex electrode 51 and the second electrode 52 are arranged in parallel along a direction of a short side of the second substrate 20, and therefore, extending directions of the multiplex electrode 51 and the second electrode 52 in the second transparent electrode structure 50 are perpendicular to the extending directions of the multiplex electrode 41 and the first electrode 42 in the first transparent electrode structure 40, so as to detect touch signals of all effective regions of the grating cell in the touch period, and to locate the touch position accurately. Exemplarily, as shown in FIG. 6, each of the multiplex electrodes 51 or the second electrodes 52 may include four strip electrodes, and both ends of the four strip electrodes are connected to a signal line, respectively, so as to be electrically connected with each other.

Optionally, in the second transparent electrode structure 50, each of the second electrodes 52 includes at least two strip electrodes, and in the second transparent electrode structure 50, both ends of at least two strip electrodes in each of the second electrodes 52 are connected to a signal line, respectively, so as to be electrically connected with each other. In fact, the multiplex electrode 51 and the second electrode 52 in the second transparent electrode structure 50 have a same structure, each of which comprises a plurality of strip electrodes and spaces between the strip electrodes; as shown in FIG. 6, each of which comprises four strip electrodes and three spaces therebetween, wherein the space is about 2 pixels wide. Both ends of the strip electrodes for forming each multiplex electrode or second electrode are connected to a signal line, respectively, so as to realize electrical connection between the four strip electrodes. These signal lines are distributed in rows or columns, wherein a signal line of an odd-numbered row (or column) corresponds to the multiplex electrode, and a signal line of an even-numbered row (or column) corresponds to the second electrode (which is a touch signal blank region). For example, the signal lines shown in FIG. 6 are numbered by R1, R3, R2 . . . from top to bottom, odd-numbered rows RE R3 . . . are multiplex electrodes, for detecting a touch signal, and even-numbered rows R2, R4 . . . are the touch signal blank regions, for separating adjacent touch sensing electrodes, to prevent signal interference to each other.

Although the multiplex electrode 51 and the second electrode 52 have a same structure, they have different functions; in the display period, the multiplex electrode 51 and the second electrode 52 are used as grating electrodes at the same time; and in the touch period, only the multiplex electrode 51 is used as a touch sensing electrode, for detecting a touch signal, and the second electrode 52 is distributed between the multiplex electrodes 51, and is used as the touch signal blank region, to prevent interference to a touch signal of each other caused by close distribution of the touch signal electrodes.

The first transparent electrode structure 40 and the second transparent electrode structure 50 realize a 3D stereoscopic function and a touch function by using a time-sequential driving manner, to drive a 3D display signal and a touch signal in a time-sequential manner, then achieving a purpose of integrating the touch function into the grating cell.

Exemplarily, in the display period, the 3D stereoscopic function is opened, and a same grating cell driving signal is input into signal lines (R1, R2, R3, R4 . . . ) on the second substrate, and meanwhile, a grating cell driving signal is input into a common electrode on the first substrate. In the touch period, the touch function is opened, a touch driving signal is sent to a touch driving electrode on the first substrate, that is, the multiplex electrode. Touch signal acquiring is performed to the signal lines of the odd-numbered rows R1, R3 . . . as the touch signal lines on the second substrate, and no signal is input into the even-numbered rows R2, R4 . . . , which are used as invalid regions of touch function, to avoid interference between the touch signal lines of the odd-numbered rows.

It should be noted that, the multiplex electrode, the first electrode and the second electrode are made of a transparent conductive material such as Tin Oxide Indium (ITO).

It should be further noted that, in the embodiment, it is taken an example that the touch driving electrode and the common electrode share electrodes, which are arranged on the first substrate at the same time, and the touch sensing electrode and the grating electrode share electrodes, which are arranged on the second substrate for description, but in fact, there is no specific limitation to corresponding relationship between the touch driving electrode/the touch sensing electrode and the common electrode/the grating electrode, as long as integration of touch function and grating light-splitting function is realized. Based on the touch grating cell provided by an embodiment of the disclosure, a touch screen adopts an In-cell structural design, and touch function is integrated in the grating cell, a grating electrode and a common electrode in the grating cell and a touch driving electrode and a touch sensing electrode share electrodes, corresponding pattern is fabricated on a same pair of base substrates, and parallax barrier stereoscopic display and touch function can be realized in different time periods by a time-sequential driving manner, so that fabrication process is reduced, processing cost is reduced, and purpose of thinning the device is achieved at the same time.

A Second Embodiment

Figure 7:
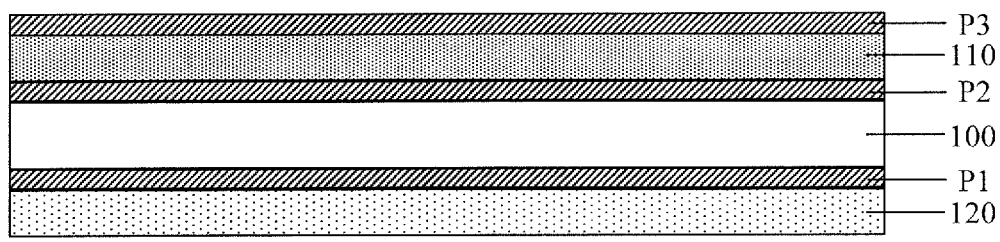
FIG. 7 is a structural schematic diagram of a touch stereoscopic display device provided by a second embodiment of the disclosure.

The embodiment further provides a touch stereoscopic display device, comprising a display screen 100 and a touch grating cell 110 described in the first embodiment; the touch grating cell 110 is arranged on a light outgoing surface of the display screen 100, and a backlight 120 is arranged on a lower surface of the display screen 100, a structural schematic diagram is shown in FIG. 7.

Optionally, a polarizer is further arranged between the touch grating cell and the display screen. Because it is necessary to arrange one polarizer on each of upper and lower surfaces of the display screen, and it is also necessary to arrange one polarizer on each of the upper and lower surfaces of the touch grating cell, but the touch grating cell and the display screen may share one polarizer at boundary, therefore, it is needed three polarizers, that is, a first polarizer P1 is arranged on the lower surface of the display screen 100, a second polarizer P2 is arranged on the upper surface of the display screen 100, and a third polarizer P3 is arranged on the upper surface of the touch grating cell 110, as shown in FIG. 7.

It should be further noted that, an alignment layer is arranged on a surface of the first transparent electrode structure of the touch grating cell away from the first substrate and on a surface of the second transparent electrode structure away from the second substrate respectively, the alignment layer directly contacts with a liquid crystal layer, and is used for providing pre-tilt angle for deflection of liquid crystal molecules, and finally-formed touch grating cell has a similar structure to a liquid crystal cell, which will be not repeated here.

In the embodiment, the display device may be: an E-paper, a mobile phone, a tablet computer, a television, a laptop, a digital photo frame, a navigator, or any other product or component having a display function.

For the touch grating cell provided by embodiments of the disclosure, a touch screen adopts an In-cell structural design, and touch function is integrated in the grating cell, the grating electrode and the common electrode in the grating cell and the touch driving electrode and the touch sensing electrode share electrodes, corresponding pattern is fabricated on a same pair of base substrates, and parallax barrier stereoscopic display and touch function can be realized in different time periods by a method of time-sequential driving, so that fabrication process is reduced, processing cost is reduced, and purpose of thinning the device is achieved at the same time.

The foregoing embodiments merely are exemplary embodiments of the disclosure, and not intended to define the scope of the disclosure. An ordinarily skilled in the art can also make various variation and transformation within the spirit and scope of the disclosure; therefore, all the equivalent technical solutions also belong to the scope of the disclosure, and the protection scope of the disclosure is determined by the appended claims.

The present application claims priority of Chinese Patent Application No. 201410647772.4 filed on Nov. 14, 2014, the disclosure of which is incorporated herein by reference in its entirety as part of the present application.

The invention claimed is:

1. A touch grating cell, comprising:
a first substrate and a second substrate, arranged opposite to each other;
a liquid crystal layer, arranged between the first substrate and the second substrate;
a first transparent electrode structure, arranged on the first substrate; and
a second transparent electrode structure, arranged on the second substrate,
wherein each of the first transparent electrode structure and the second transparent electrode structure includes a plurality of multiplex electrodes; in a touch period, all of the multiplex electrodes in the first transparent electrode structure and all of the multiplex electrodes in the second transparent electrode structure are used as a touch driving electrode and a touch sensing electrode, respectively, and are perpendicular to each other in extending directions; and in a grating forming period, all of the multiplex electrodes in the first transparent electrode structure and all of the multiplex electrodes in the second transparent electrode structure are used as a common electrode and a grating electrode, respectively;
the first transparent electrode structure includes the plurality of multiplex electrodes and a plurality of first electrodes, the first electrodes being used as the common electrode in the grating forming period, and being used as a touch signal blank region in the touch period; and
the second transparent electrode structure includes a plurality of strip electrodes, and each of the multiplex electrodes of the second transparent electrode structure includes at least two adjacent strip electrodes which are electrically connected with each other by connecting both ends thereof to a signal line, respectively.

2. The touch grating cell according to claim 1, wherein in the first transparent electrode structure, a width of each of the first electrodes is greater than a width of each of the multiplex electrodes.

3. The touch grating cell according to claim 1, wherein in the first transparent electrode structure, the plurality of first electrodes and the plurality of multiplex electrodes are arranged alternately at intervals.

4. The touch grating cell according to claim 1, wherein in the second transparent electrode structure, a second electrode is further arranged between any two adjacent multiplex electrodes, and the second electrode is not applied a touch signal in the touch period.

5. The touch grating cell according to claim 4, wherein in the second transparent electrode structure, each of the second electrodes includes at least two strip electrodes.

6. The touch grating cell according to claim 5, wherein in the second transparent electrode structure, both ends of at least two strip electrodes in each of the second electrodes are connected to a signal line, respectively, so as to be electrically connected with each other.

7. A touch stereoscopic display device, comprising
a display screen;
a touch grating cell according to claim 1, arranged on a light outgoing surface of the display screen; and
a backlight, arranged on a light incoming surface of the display screen.

8. The touch stereoscopic display device according to claim 7, wherein the touch grating cell and the display screen share one polarizer in an adjoining place.

9. A touch grating cell, comprising:
a first substrate and a second substrate, arranged opposite to each other;
a liquid crystal layer, arranged between the first substrate and the second substrate;
a first transparent electrode structure, arranged on the first substrate; and
a second transparent electrode structure, arranged on the second substrate,
wherein each of the first transparent electrode structure and the second transparent electrode structure includes a plurality of multiplex electrodes; in a touch period, all of the multiplex electrodes in the first transparent electrode structure and all of the multiplex electrodes in the second transparent electrode structure are used as a touch driving electrode and a touch sensing electrode, respectively, and are perpendicular to each other in extending directions; and in a grating forming period, which does not overlap with the touch period in time, all of the multiplex electrodes in the first transparent electrode structure and all of the multiplex electrodes in the second transparent electrode structure are used as a common electrode and a grating electrode, respectively;
the second transparent electrode structure further comprises a second electrode arranged between every two adjacent multiplex electrodes of the second transparent electrode structure, each of the second electrode includes at least two adjacent strip electrodes, a distance between two adjacent strip electrodes in a first direction is smaller than a distance between the second electrode and the multiplex electrode of the second transparent electrode structure, which are adjacent to each other, in the first direction, the first direction is perpendicular to an extending direction of the strip electrodes.

10. A touch grating cell, comprising:
a first substrate and a second substrate, arranged opposite to each other;
a liquid crystal layer, arranged between the first substrate and the second substrate;
a first transparent electrode structure, arranged on the first substrate; and
a second transparent electrode structure, arranged on the second substrate,
wherein each of the first transparent electrode structure and the second transparent electrode structure includes a plurality of multiplex electrodes; in a touch period, all of the multiplex electrodes in the first transparent electrode structure and all of the multiplex electrodes in the second transparent electrode structure are used as a touch driving electrode and a touch sensing electrode, respectively, and are perpendicular to each other in extending directions; and in a grating forming period, all of the multiplex electrodes in the first transparent electrode structure and all of the multiplex electrodes in the second transparent electrode structure are used as a common electrode and a grating electrode, respectively;
wherein the first transparent electrode structure includes the plurality of multiplex electrodes and a plurality of first electrodes, the plurality of first electrodes and the plurality of multiplex electrodes are arranged alternately at intervals, and the first electrode being used as the common electrode in the grating forming period and being used as a touch signal blank region in the touch period;

wherein the second transparent electrode structure further comprises a second electrode arranged between two adjacent multiplex electrodes of the second transparent electrode structure, a length of the second electrode in an extending direction thereof is not equal to a length of each multiplex electrode of the second transparent electrode structure in an extending direction thereof.

11. The touch grating cell according to claim 10, wherein in the first transparent electrode structure, a width of each of the first electrodes is greater than a width of each of the multiplex electrodes.

12. The touch grating cell according to claim 10, wherein the second transparent electrode structure includes a plurality of strip electrodes, and each of the multiplex electrodes includes at least two adjacent strip electrodes which are electrically connected with each other by connecting both ends thereof to a signal line, respectively.

13. The touch grating cell according to claim 12, wherein in the second transparent electrode structure, a second electrode is further arranged between any two adjacent multiplex electrodes, and the second electrode is not applied a touch signal in the touch period.

14. The touch grating cell according to claim 13, wherein in the second transparent electrode structure, each of the second electrodes includes at least two strip electrodes.

15. The touch grating cell according to claim 14, wherein in the second transparent electrode structure, both ends of at least two strip electrodes in each of the second electrodes are connected to a signal line, respectively, so as to be electrically connected with each other.

16. A touch stereoscopic display device, comprising
a display screen;
a touch grating cell according to claim 10, arranged on a light outgoing surface of the display screen; and
a backlight, arranged on a light incoming surface of the display screen.

17. The touch stereoscopic display device according to claim 16, wherein the touch grating cell and the display screen share one polarizer in an adjoining place.

* * * * *